United States Patent
Jolfaei et al.

(10) Patent No.: US 10,432,704 B2
(45) Date of Patent: Oct. 1, 2019

(54) TRANSLATION OF MESSAGES USING SENSOR-SPECIFIC AND UNIFIED PROTOCOLS

(71) Applicant: SAP SE, Walldorf (DE)

(72) Inventors: Masoud Aghadavoodi Jolfaei, Wueskicg (DE); Oliver Luik, Wiesloch (DE)

(73) Assignee: SAP SE, Walldorf (DE)

( * ) Notice: Subject to any disclaimer, the term of this patent is extended or adjusted under 35 U.S.C. 154(b) by 222 days.

(21) Appl. No.: 15/078,382

(22) Filed: Mar. 23, 2016

(65) Prior Publication Data
US 2017/0279874 A1 Sep. 28, 2017

(51) Int. Cl.
G06F 15/16 (2006.01)
H04L 29/08 (2006.01)

(52) U.S. Cl.
CPC .......... H04L 67/1002 (2013.01); H04L 67/12 (2013.01); H04L 67/2823 (2013.01)

(58) Field of Classification Search
CPC ..... H04L 67/1002; H04L 67/12; H04L 63/08; H04L 69/08; H04L 69/18; H04L 12/2836
USPC ........................................................ 709/204
See application file for complete search history.

(56) References Cited

U.S. PATENT DOCUMENTS

| | | | |
|---|---|---|---|
| 7,197,545 B1 * | 3/2007 | Davie | G06F 3/0605 709/220 |
| 7,500,133 B2 | 3/2009 | Galchev et al. | |
| 7,580,915 B2 | 8/2009 | Braun et al. | |
| 7,587,399 B2 | 9/2009 | Kilian et al. | |
| 7,593,930 B2 | 9/2009 | Braun et al. | |
| 7,672,949 B2 | 3/2010 | Kilian et al. | |
| 7,694,065 B2 | 4/2010 | Petev et al. | |
| 7,823,170 B2 | 10/2010 | Jolfaei et al. | |
| 7,933,947 B2 | 4/2011 | Fleischer et al. | |
| 7,945,677 B2 | 5/2011 | Fleischer et al. | |
| 7,966,412 B2 | 6/2011 | Luik et al. | |
| 7,996,615 B2 | 8/2011 | Galchev et al. | |
| 8,051,152 B2 | 11/2011 | Rehm et al. | |
| 8,140,580 B2 | 3/2012 | Rehm et al. | |
| 8,140,678 B2 | 3/2012 | Fleischer et al. | |
| 8,161,169 B2 | 4/2012 | Fleischer et al. | |
| 8,533,717 B2 | 9/2013 | Kilian et al. | |
| 8,636,178 B2 | 1/2014 | Jolfaei | |
| 8,701,180 B2 | 4/2014 | Jolfaei | |
| 8,706,844 B2 | 4/2014 | Jolfaei | |

(Continued)

Primary Examiner — Oscar A Louie
Assistant Examiner — Oluwatosin M Gidado
(74) Attorney, Agent, or Firm — Fish & Richardson P.C.

(57) ABSTRACT

The present disclosure involves systems, software, and computer implemented methods for translating messages between a sensor-specific protocol and a unified protocol associated with a backend application server. One example method includes: receiving, at a load balancer, a first message from a first sensor to a backend application server, the first message in a first sensor-specific protocol; identifying, by the load balancer, the first sensor-specific protocol of the first message; translating, by the load balancer, the first message from the first sensor-specific protocol to a second message in the unified protocol associated with the backend application server; and transmitting, by the load balancer, the second message in the unified protocol to the backend application server for processing.

16 Claims, 7 Drawing Sheets

(56) References Cited

U.S. PATENT DOCUMENTS

| | | |
|---|---|---|
| 8,706,887 B2 | 4/2014 | Jolfaei |
| 8,707,323 B2 | 4/2014 | Galchev et al. |
| 8,826,308 B1 | 9/2014 | Jolfaei et al. |
| 8,843,526 B2 | 9/2014 | Stoeck et al. |
| 9,009,409 B2 | 4/2015 | Galchev et al. |
| 9,043,815 B2 | 5/2015 | Jolfaei et al. |
| 9,191,389 B2 | 11/2015 | Jolfaei |
| 9,219,774 B2 | 12/2015 | Jolfaei |
| 9,614,924 B2 * | 4/2017 | Brand ................. H04L 67/2842 |
| 2009/0097397 A1* | 4/2009 | Moreira Sa de Souza ................. H04L 41/0636 370/216 |
| 2010/0172499 A1* | 7/2010 | Sugiyama ............... G06F 9/544 380/255 |
| 2011/0099232 A1* | 4/2011 | Gupta ............... H04L 29/08729 709/206 |
| 2012/0011515 A1 | 1/2012 | Jolfaei et al. |
| 2012/0158886 A1* | 6/2012 | O'Connell .............. H04L 67/22 709/217 |
| 2013/0191882 A1 | 7/2013 | Jolfaei |
| 2014/0180737 A1 | 6/2014 | Acker et al. |
| 2014/0201258 A1* | 7/2014 | Jowett .................... H04L 67/02 709/203 |
| 2015/0127799 A1* | 5/2015 | Harper ................. H04L 41/042 709/223 |
| 2017/0134536 A1* | 5/2017 | Tessiore ................. H04L 69/18 |
| 2017/0195213 A1* | 7/2017 | Evans .................... H04L 45/24 |

\* cited by examiner

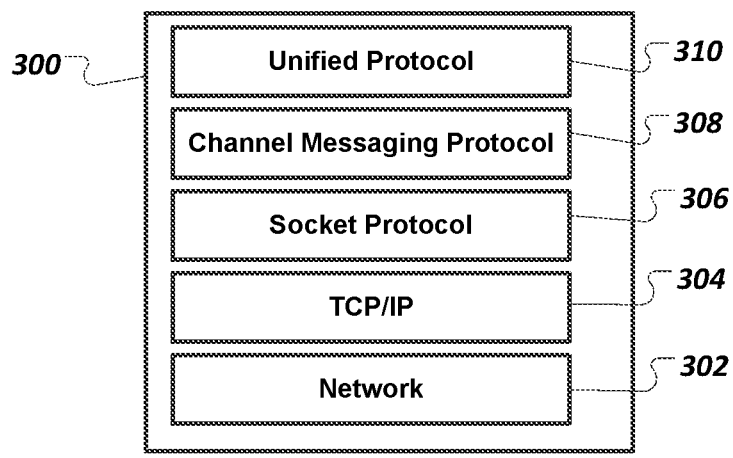
FIG. 3A    Protocol Stack
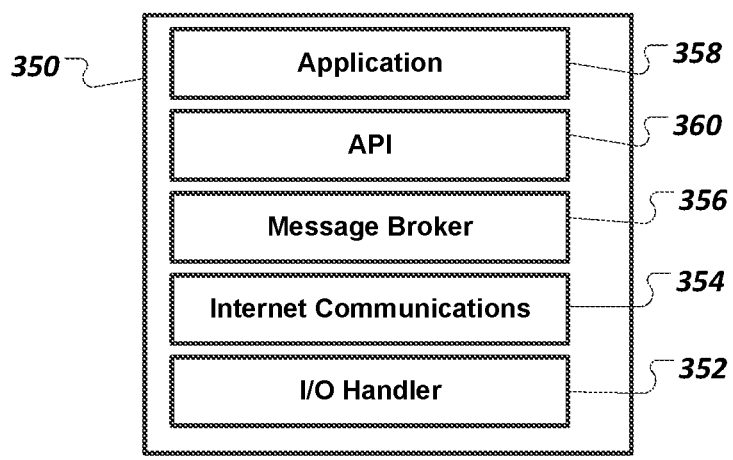
FIG. 3B    Server Work Processes

402 ⎯ Connect Message
action: MESSAGE
type: CONNECT
version: <requested protocol version>
clientid: <client_identifier>

404 ⎯ Connection Response Message
action: MESSAGE
type: CONNRESP
version: <chosen protocol version>
clientid: <client_identifier>

406 ⎯ Publish Message
action: MESSAGE
type: PUBLISH
clientid: <client_identifier>
topic: <topic_name>
qos: <qos integer>
packetid: <integer>
dup: <boolean>
retainflag: <bool: 0/1>
message body: text / binary (can be empty), size < 4KB 407 ⎯ Publish Acknowledge Message
action: MESSAGE
type: PUBACK
clientid: <client_identifier>
packetid: <integer>

408 ⎯ Subscribe Message
action: MESSAGE
type: SUBSCRIBE
clientid: <client_identifier>
topiclist: <topic_name>,<qos integer>

410 ⎯ Subscribe Acknowledge Message
action: MESSAGE
type: SUBACK
rclist: <rc for 1st topic>, ..., <rc for n-th topic>

412 ⎯ Unsubscribe Message
action: MESSAGE
type: UNSUBSCRIBE
clientid: <client_identifier>
topiclist: <topic_name>,<qos integer>

414 ⎯ Unsubscribe Acknowledge Message
action: MESSAGE
type: UNSUBACK
rclist: <rc for 1st topic>, ..., <rc for n-th topic>

416 ⎯ Disconnect Message
action: MESSAGE
type: DISCONNECT
clientid: <client_identifier>

TRANSLATION OF MESSAGES USING SENSOR-SPECIFIC AND UNIFIED PROTOCOLS

TECHNICAL FIELD

The present disclosure relates to computer-implemented methods, software, and systems for translating messages between a sensor-specific protocol and a unified protocol associated with a backend application server.

BACKGROUND

A communications protocol stack can be an implementation of a particular computer networking protocol suite. Individual protocols within a suite can each have a defined purpose. Such modularization of functionality can facilitate design and implementation. In the protocol stack, a given module may communicate, for example, with two other modules (e.g., a module above the given module and a module below the given module). A lowest level of the protocol stack deals with, for example, hardware interactions. Every higher layer adds more features. A highest level of the protocol stack deals with, for example, application considerations. For some protocols, each layer can be considered a media (e.g., lowest), a transport (e.g., middle), or an application (e.g., highest) layer.

SUMMARY

The present disclosure involves systems, software, and computer implemented methods for translating messages between a sensor-specific protocol and a unified protocol associated with a backend application server. One example method includes receiving, at a load balancer, a first message from a first sensor to a backend application server, the first message in a first sensor-specific protocol; identifying, by the load balancer, the first sensor-specific protocol of the first message; translating, by the load balancer, the first message from the first sensor-specific protocol to a second message in the unified protocol associated with the backend application server; and transmitting, by the load balancer, the second message in the unified protocol to the backend application server for processing.

While generally described as computer-implemented software embodied on tangible and/or non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3A illustrates a protocol stack that represents protocols used by a load balancer in response to a receipt of a message by the load balancer from a sensor.

FIG. 3B illustrates work processes that are used for the handling of a message received by an application server.

FIG. 4 illustrates an example set of messages that can be sent from a sensor to a server or from a server to a sensor.

DETAILED DESCRIPTION

Figure 1:
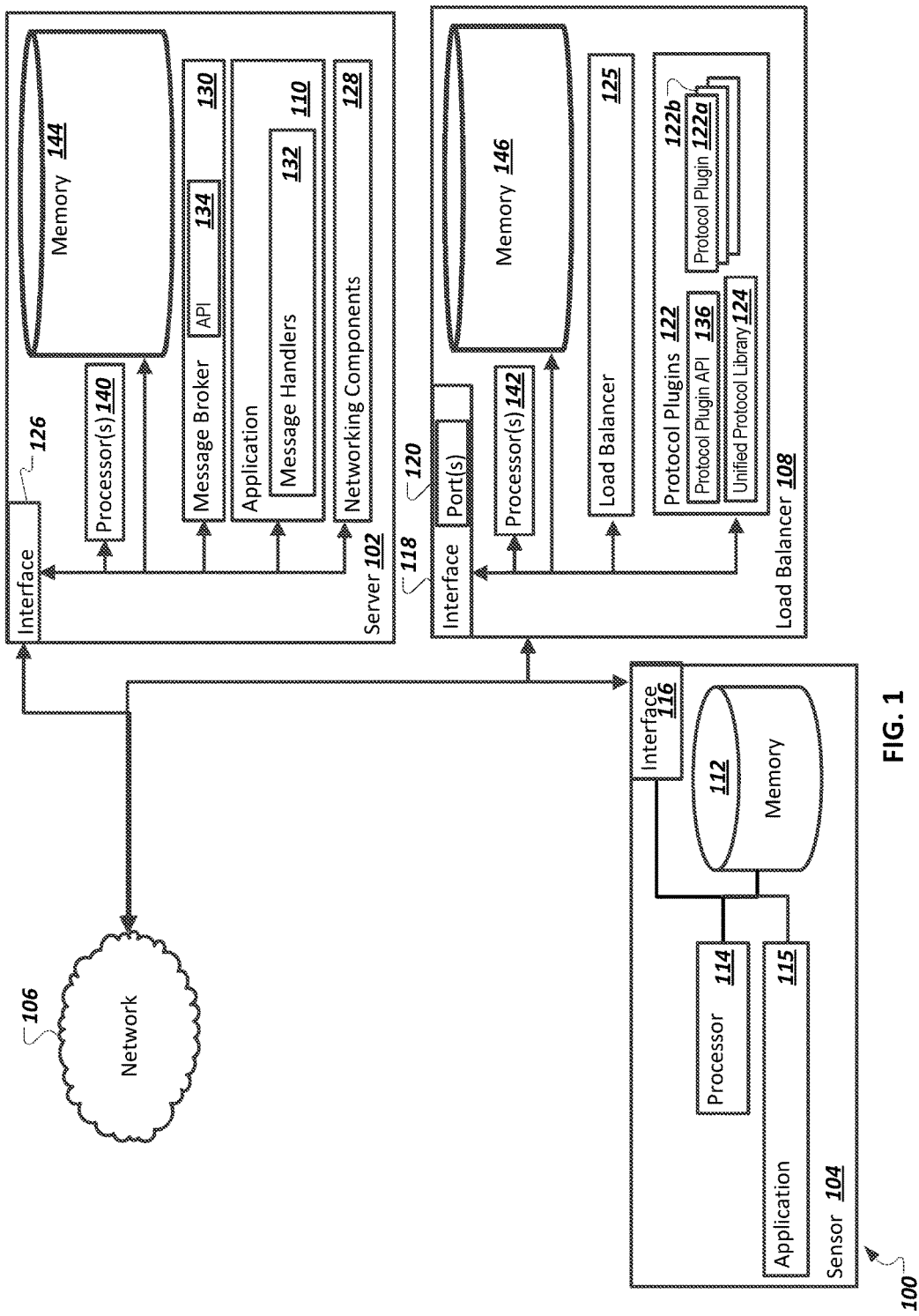
FIG. 1 is a block diagram illustrating an example system for translating messages between a sensor-specific protocol and a unified protocol associated with a backend application server.

A developer may desire to write applications that interact with a variety of sensors. A sensor can be, for example, a device that can send (and sometimes also receive) data over a network. For example, a developer can be writing an application for a "smart factory" system, a cyber-physical system, or another type of system which includes automation, data exchange, monitoring of physical processes, physical world modeling, cooperating systems and devices, and remote sensing and controlling of a network of sensors over a communications network. The network of sensors can be referred to as the "internet of things." As a particular example, a developer can write a predictive maintenance application which consumes sensor-based information provided by sensors through a location, machine, or workflow, detects malfunctioning devices, and triggers relevant business workflow processes in real time in response to detection of the malfunctioning devices.

Sensors can be configured to communicate using a sensor-specific protocol which is relatively simpler than traditional computer communication protocols. A sensor-specific protocol can be, for example, MQTT (Message Queuing Telemetry Transport), DDS (Data Distribution Service), or AMQP (Advanced Message Queuing Protocol), among others. Use of a sensor-specific protocol that is simpler than traditional protocols can enable sensors to be configured using less processing and other resources than traditional computing devices. Such lightweight sensors can enable networking technology to be incorporated into many different types of physical objects. The developer may wish to write, for example, server applications which run on existing server platforms that make use of existing server technology as well as information received from a network of sensors. The existing server technology can include, for example, multiple communication protocols, database technology, multiple processors, etc.

A load balancer that is configured to distribute workloads across servers can be modified to translate communication messages to and from the sensor-specific protocol and other protocols known by the server. Messages in a sensor-specific protocol can be encapsulated in a message in a server-protocol format before being sent to the server. The server can receive and send messages in a protocol that is already known to the server, which can enable applications to be written that make use of sensor data and that send and receive data to and from sensors in the sensor network. The load balancer can integrate with the server so that the server can communicate, through the load balancer, with sensors that understand the sensor-specific protocol.

Modifying the load balancer to add support to a server system for sensor-specific protocols can result in reducing the complexity of the backend application server, since protocol translation for sensor-specific protocols is not required to be added to the backend application server. Avoiding modifications to the backend application server can result in lower cost of ownership, higher availability, higher security, and easier supportability for the backend application server. New protocols can be supported without the need to modify and restart the application server. Modifying the existing load balancer as compared to adding a new server for translation avoids setup and integration tasks and complexity, and performance issues that can occur when adding a new server to the system. A new server can add latency issues that may not be acceptable for sensor-related applications. Modifying the load balancer avoids such latency concerns.

FIG. 1 is a block diagram illustrating an example system 100 for translating messages between a sensor-specific protocol and a unified protocol associated with a backend application server 102. Specifically, the illustrated system 100 includes or is communicably coupled with the backend application server 102, a sensor 104, a network 106, and a load balancer 108. The load balancer 108, which is configured to perform load balancing of messages sent to the backend application server 102 and other servers, can be modified to perform translation of messages between the sensor-specific protocol and the unified protocol. Although shown separately, in some implementations, functionality of two or more systems or servers may be provided by a single system or server. Alternatively, elements illustrated in a single element may be split into two or more elements in some implementations. The sensor 104 may generally be a computing device operable to connect to or communicate with the load balancer 108 via the network 106 using a wireline or wireless connection using a sensor-specific protocol. Although one sensor 104 is displayed, other sensors may be included in the system 100.

An application developer may desire to write an application 110 to execute on the backend application server 102 that receives and processes data from the sensor 104 (and possibly other sensors). The sensor 104 may be configured to send and receive messages in a sensor-specific protocol, for example, MQTT, DDS, or AMQP, among others. For example, a size of memory 112 and/or capability of a processor 114 may limit the sensor 104 from implementing other protocols other than the sensor-specific protocol. A sensor may have other reduced functionality as compared to other computing devices. An application 115 associated with the sensor 104 can be configured to send messages in the sensor-specific protocol, using an interface 116, to the load balancer 108.

The load balancer 108 can receive messages from the sensor 104 (and other sensors) using an interface 118. For example, the interface 118 can be associated with one or more ports 120 that can be referenced in messages received from sensors. For example, the sensor 104 can send a message in a first sensor-specific protocol to a first port associated with the interface 118 and with a first sensor-specific protocol. Another sensor can send a message in a second, different sensor-specific protocol to a second, different port associated with the interface 118 and with the second sensor-specific protocol. Other methods of differentiating different sensor-specific protocols can be performed. For example, different addresses or other types of parameters can be included in messages sent using different sensor-specific protocols.

The load balancer 108 can be modified to include functionality to translate a message received from the sensor 104 from a sensor-specific protocol to a unified protocol understood by the backend application server 102. In other words, sensor data from the sensor 104 can be encapsulated in the translated unified-protocol message. The unified protocol can be defined using protocols in use by the backend application server 102.

For example, a plug-ins component 122 can be added to the load balancer 108 to perform message translation. A plug-in 122a that is specific to the sensor-specific protocol in a received message can translate the received message from the sensor-specific protocol to the unified protocol. The plug-in 122a can use a unified protocol library 124 for parsing and generation of unified protocol messages. The protocol plugin 122 can identify a message frame that can be defined, for example, by delimiting characters that do not occur elsewhere in the message, by a frame size inside the message itself or based on a predefined fixed-size frame. A received message can include a message header and a message payload. The message header can include metadata, such as a message type, message size, or quality of service. The protocol plugin 122 can, for some or all messages, map header information in a received message to corresponding header information in a translated message in the unified protocol. For some messages, the protocol plugin 122 can put the entire received message, including header fields, into a payload portion of the unified protocol message, such as when the protocol plugin 122 is not able to map some or all message headers to corresponding unified protocol message headers. As described in more detail below, the plug-in 122a can call a load balancer component 125 to select the backend application server 102 as a server to receive the translated message. The backend application server 102 can receive the translated message using an interface 126. Networking components 128 can provide the translated message to a message broker 130. The message broker 130 can identify the application 110 as a recipient of the translated message. The message broker 130 can extract the sensor data from the encapsulated message, invoke a message handler 132 of the application 110, and provide the sensor data to the message handler 132. The message handler 132 can process the sensor data. The message broker 134 can extract information from unified protocol message headers, such as to determine a recipient application, message delivery details, a message topic, or other information. The message broker 134 generally does not analyze the message payload portion of a message (such analysis can be performed by an application). The message broker 134 can forward the message payload of the unified protocol message to an application, for example. The message handler of the application can also access header information of the unified protocol message.

For some message types, a response message can be sent from the application 110 to the sensor 104 via the load balancer 108. The load balancer 108 can translate the response message from the unified protocol to the sensor-specific protocol used by the sensor 104. As another example, the application 110 can be configured to send a non-response message to the sensor 104 via the load balancer 108, with the load balancer 108 translating the non-response message from the unified protocol to the sensor-specific protocol. The non-response message may be used to communicate with the sensor 104 outside of a corresponding message received from the sensor 104. For example, the application 110 may perform a status check of the sensor 104, change, modify, or otherwise query one or more settings or operating parameters of the sensor 104, or perform any other suitable action associated with the sensor 104.

Message handlers 132 can be defined by an API (Application Programming Interface) 134 provided by the message broker 130. That is, the application 110 can implement an interface provided by the message broker 130. The message broker 130 can hide network protocol and data communication details from the application 110. For example, the message broker 130 can provide message reliability, connection establishment, and error handling services for the application 110. As described in more detail below, the message broker can provide publish/subscribe features for the application 110.

The load balancer component 125 can select the backend application server 102 as a server instance to receive a translated message. The load balancer component 125 can, based on a received message, determine a type of backend application server 102 to process the message, e.g., from among multiple application server types. The load balancer component 125 can identify a group of backend application server instances of the identified type and can load balance received messages designated for that type of application server among the backend application servers of the identified type. For example, the load balancer component 125 can assign messages to a particular backend application server such as the backend application server 102 based on server capacity (e.g., with higher capacity servers receiving a higher number of messages than lower capacity servers). The load balancer component 125 can, for a given message, determine that the message is associated with a user session (e.g., where the application 110 is a stateful application). The load balancer component 125 can send messages for a same session to a same server instance.

The load balancer 108 can provide a protocol plug-in API 136 that can be used to add a new plug-in 122b to the plug-ins component 122, e.g., for a new sensor-specific protocol previously unknown to the load balancer 108. The new plug-in 122b can be configured to use the unified protocol library 124 for parsing and generation of unified protocol messages. The new plug-in 122b can be configured to translate messages between the new sensor-specific protocol and the unified protocol, for messages being sent between the backend application server 102 and a new sensor that is added to the system 100. The protocol plug-in API 136 can provide an interface for assigning a port of the ports 120 to the new sensor-specific protocol or to otherwise configure a mechanism for enabling the load balancer 108 to determine that an incoming message is in the new sensor-specific protocol format. The ability to dynamically add new plug-ins to the plug-ins component 122 enables the load balancer 108, and in turn, the backend application server 102, to support new and additional protocols without requiring modification to portions of the load balancer 108 other than the plug-ins component 122 or to the backend application server 102.

Other approaches for integrating sensors such as the sensor 104 with a server such as the server 102 include adding an additional server to the system 100, such as a server that can perform translation from protocols such as HTTP (HyperText Transfer Protocol) to MQTT and vice versa. However, the integration of an additional server with a dedicated software package can lead not only to complex infrastructure setup tasks, including many additional manual steps that can increase TCO (Total Cost of Ownership), but also increased processing and latency time of messages, which for applications such as the Internet of Things and Industry 4.0 scenarios are not tolerable, as those applications require real time processing and quick response time (e.g., in a millisecond range). Modifying the load balancer 108 to provide support for sensor protocols can provide cheaper TCO and better response time, as compared to the approach of adding an additional server.

As used in the present disclosure, the term "computer" is intended to encompass any suitable processing device. For example, although FIG. 1 illustrates a single backend application server 102 and a single sensor 104, the system 100 can be implemented using a single, stand-alone computing device, two or more servers 102, or two or more sensors 104. Indeed, the backend application server 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the backend application server 102 may be adapted to execute any operating system, including Linux, UNIX, Windows, Mac OS®, Java™, Android™, iOS or any other suitable operating system. According to one implementation, the backend application server 102 may also include or be communicably coupled with an e-mail server, a Web server, a caching server, a streaming data server, and/or other suitable server.

The interfaces 116, 118, and 126 are used by the sensor 104, the load balancer 108, and the backend application server 102, respectively, for communicating with other systems in a distributed environment—including within the system 100—connected to the network 106. Generally, the interfaces 116, 118, and 126 each comprise logic encoded in software and/or hardware in a suitable combination and operable to communicate with the network 106. More specifically, the interfaces 116, 118, and 126 may each comprise software supporting one or more communication protocols associated with communications such that the network 106 or interface's hardware is operable to communicate physical signals within and outside of the illustrated system 100.

The backend application server 102 and the load balancer 108 respectively include processor(s) 140 or 142. Each of the processor(s) 140 and 142 may be a central processing unit (CPU), a blade, an application specific integrated circuit (ASIC), a field-programmable gate array (FPGA), or another suitable component. Generally, each of the processor(s) 140 and 142 executes instructions and manipulates data to perform the operations of the backend application server 102 or the load balancer 108, respectively.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The backend application server 102 and the load balancer 108 respectively include memory 144 or 146. The memory 144 and 146 may include any type of memory or database module and may take the form of volatile and/or non-volatile memory including, without limitation, magnetic media, optical media, random access memory (RAM), read-only memory (ROM), removable media, or any other suitable local or remote memory component. The memory 144 and 146 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the backend application server 102 or load balancer 108, respectively. In some implementations, the backend application server 102 and/or the load balancer 108 include multiple memories.

The processor 114 included in the sensor 104 may be a central processing unit (CPU), an application specific integrated circuit (ASIC), a field-programmable gate array (FPGA), or another suitable component. Generally, the processor 114 included in the sensor 104 executes instructions and manipulates data to perform the operations of the sensor 104. Specifically, the processor 114 included in the sensor 104 executes the functionality required to send messages to the load balancer 108 and to receive and process message from the load balancer 108.

The memory 112 included in the sensor 104 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects or data associated with the purposes of the sensor 104.

There may be any number of sensors 104 associated with, or external to, the system 100. For example, while the illustrated system 100 includes one sensor 104, alternative implementations of the system 100 may include multiple sensors 104 communicably coupled to the load balancer 108 and/or the network 106, or any other number suitable to the purposes of the system 100. Additionally, there may also be one or more additional sensors 104 external to the illustrated portion of system 100 that are capable of interacting with the system 100 via the network 106. Further, the term "client" and "sensor" may be used interchangeably as appropriate without departing from the scope of this disclosure.

Figure 2:
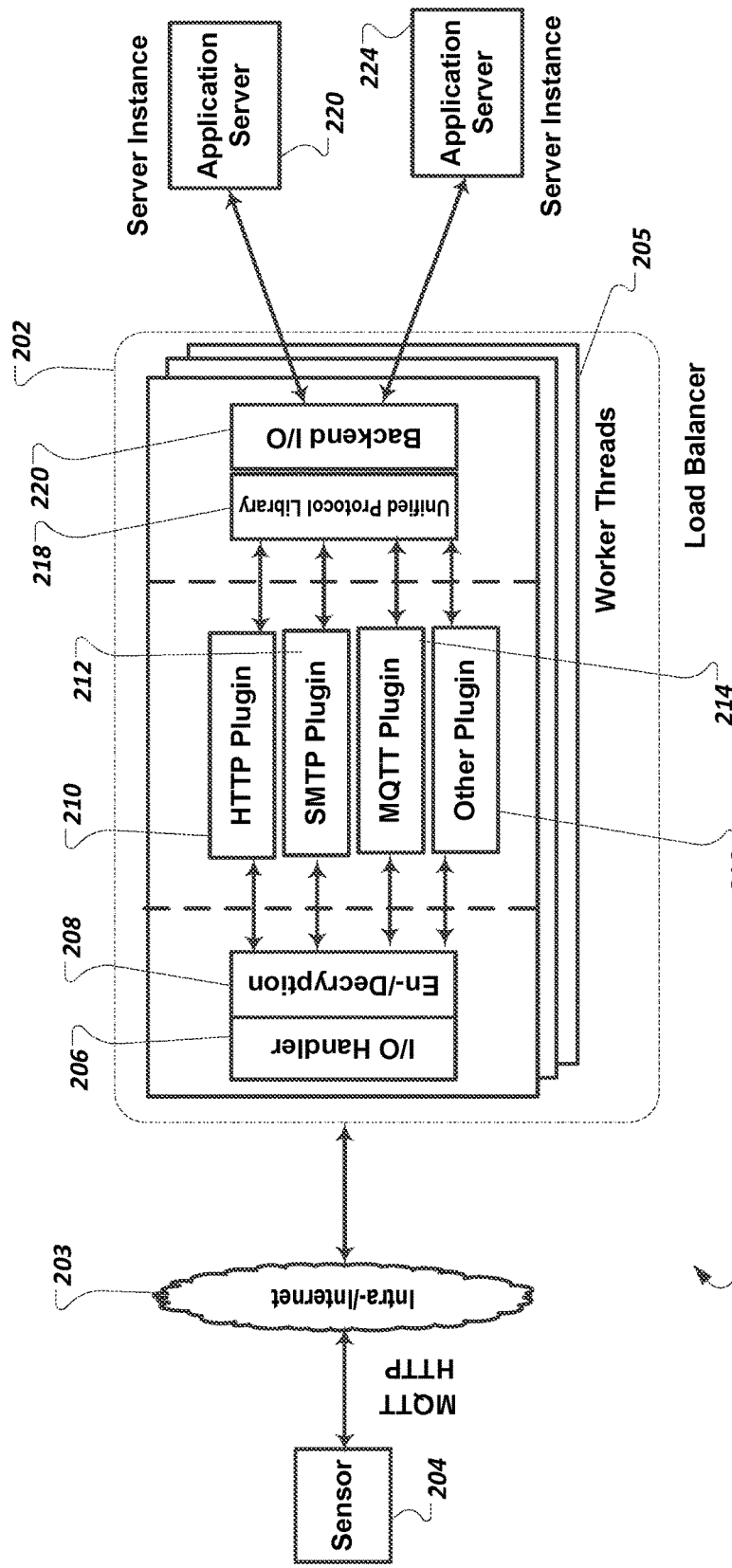
FIG. 2 is a block diagram illustrating an example system for translating messages between a sensor-specific protocol and a unified protocol associated with a backend application server.

FIG. 2 is a block diagram illustrating an example system 200 for translating a message from a sensor-specific protocol to a unified protocol associated with a backend application server. A load balancer 202 receives messages (e.g., HTTP (HyperText Transfer Protocol), sensor-specific (e.g., MQTT) messages) over a network 203 (e.g., the Internet). For example, the load balancer 202 can receive MQTT messages from a sensor 204. The load balancer 202 can include multiple worker threads 205 to handle multiple received messages in parallel. An I/O (Input/Output) handler 206 included in the load balancer 202 can use an Encryption / Decryption component 208 to decrypt a received message (if necessary). The I/O handler 206 can determine a type of the received message and can invoke a plug-in component (e.g., an HTTP plugin 210, an SMTP (Simple Mail Transfer Protocol) plugin 212, an MQTT plugin 214, or another plugin 216 associated with some other protocol) associated with the determined type to handle the received message.

For example, the I/O handler 206 can invoke the MQTT plugin 214 to handle the receipt from the sensor 204 of a sensor-specific message associated with the MQTT protocol. The I/O handler 206 can determine the type of an incoming message and a particular plugin to invoke based, for example, on which port the message was received. Other methods of differentiating different sensor-specific protocols can be performed. For example, different addresses or other types of parameters can be included in messages sent using different sensor-specific protocols. The invoked plugin (e.g., the MQTT plugin 214) can use a unified protocol library 218 to translate the received message from the type of the received message (e.g., MQTT) to the unified protocol. The load balancer 202 can select a server instance (e.g., a first server instance 220 or a second server instance 222) to receive the translated message. A backend I/O component 224 can send the translated message to the selected server instance (e.g., the first server instance 220).

FIG. 3A illustrates a protocol stack 300 that represents protocols used by a load balancer in response to a receipt of a message by the load balancer from a sensor. The load balancer can receive a message from a sensor over a network at a network layer 302. The message can be, for example, in a sensor-specific protocol format received using the TCP/IP protocol, as indicated by a TCP/IP layer 304. The load balancer can convert the sensor-specific protocol message into a socket protocol message, as indicated by a socket protocol layer 306.

In the application server the socket protocol layer 306 can be associated with a push channel implementation of the socket protocol. The push channel implementation can include an API for both client and server connections, a table of connections and task types used by the task handler, resource handling of socket connections including distinction between stateless and stateful server connections, and features such as connection maintenance and pinging that are hidden from the application developer.

The socket protocol message can be converted into a channel messaging protocol message, as indicated by a channel messaging protocol layer 308. A channel messaging protocol message can include header fields and a message body. Header fields can include a name-value pair and can be separated by line feeds. The load balancer can convert the channel messaging protocol message into a unified protocol message, for sending to an application server, as indicated by a unified protocol layer 310. The unified protocol layer 310 can define application messages (described in more detail below with respect to FIG. 4) that can result in handler execution within an application, and system messages, such as for connection establishment and reliable message delivery, that are handled by a message broker framework and not seen by applications.

The channel messaging protocol layer 308 can provide an infrastructure for sending push messages within the server (or to clients connected to the server). Communications performed using the channel messaging protocol layer 308 follow a "publish/subscribe" mechanism to send push messages to server sessions and external clients that support the socket protocol. Sessions or clients can subscribe to particular messaging channels, for example. A particular socket connection can be bound to a particular messaging channel. When a server session sends a message to a channel, the message is delivered to each server session or client that is registered to the channel. Accordingly, the channel messaging protocol layer 308 can provide a 1:N push notification service between server sessions and socket clients.

FIG. 3B illustrates work processes that are used for the handling of a message received by an application server 350. An I/O handler 352 receives the incoming message from the network and provides the message to an internet communications component 354. The internet communications component 354 provides the message to a message broker 356. The message broker 356 identifies an application 358 that is to receive the message and invokes an API 360 to invoke a message handler of the application 358 that handles the received message.

FIG. 4 illustrates an example set 400 of messages 402-416 that can be sent from a sensor to a server or from a server to a sensor. The messages 402-416 can each include an "action" field that indicates that a respective message 402-416 is a message between a sensor and the server. A connect message 402 can be sent from a sensor to the server to establish a connection with the server. The connect message 402 can include a type field indicating a connect message type, a version identifier of a requested protocol version, and a client (e.g., sensor) identifier. The client identifier can be, for example, a string value defined by the sensor. The connect message 402 can be sent without the inclusion of a message body.

A message broker instance can be instantiated in response to receipt of the connect message 402. The message broker can invoke message handlers of a server application in response to receiving messages from a sensor. For example, the message broker can invoke an onStart message handler in response to receipt of the connect message 402.

The onStart message handler can prepare and initiate the sending of a connection response message 404 to be sent from the server to the sensor in response to the connect message 402, e.g., to acknowledge the connect message 402. The connection response message 404 can include a type field that indicates a connection response message type, a version identifier of a chosen (e.g., supported) protocol version, and a client (e.g., sensor) identifier of the sensor who sent the connect message to which the connection response message is responsive. The connection response message 404 can be sent without the inclusion of a message body. The chosen protocol version can be the same as the requested protocol version if the server supports the requested protocol version. As another example, the server can downgrade the protocol version requested by the sensor in the connect message 404. For example, if the server does not support the requested protocol version, a value of zero can be returned in the chosen protocol version field. As another example, a version number of a supported protocol version that is different from the requested protocol version can be returned in the chosen protocol version field.

A publish message 406 can be sent by a sensor to the server to publish a message for a specified topic. The publish message 406 can include a message type field that indicates a publish message type and a client identifier that identifies the sensor. The publish message 406 can include a topic field that identifies the topic to which the publish message 406 is to be published. The publish message 406 can be provided, for example, to server applications that have subscribed to the specified topic. An "onMessage" message handler can be invoked in each application that has subscribed to the topic, to process the received message in each respective application.

A message body field included in the publish message 406 can include the body of a message to be sent to server applications that have subscribed to the specified topic. The publish message 406 can include a duplicate indication field (e.g., "dup") that indicates whether the publish message 406 represents a resending of a previously published message. A packet identifier field can uniquely identify the publish message 406.

A retain flag field can indicate to the message broker to store the message in the message broker and to send to an application or sensor that subscribes to the topic after the message has been sent. The message broker can store a most recent message, for example. The retain flag can be used to update a newly connected and subscribed application or sensor with a last value stored at the message broker. For example, a data-providing sensor may only send data periodically (e.g., every hour, every day). A newly connected and subscribed sensor or application may, without use of the retain flag, have to wait up until the next period to get a value from the data-providing sensor. With the retain flag, a sensor can indicate that a message with this flag should be send to a newly connected and subscribed application or sensor as a first message. The message broker can store the retained message and send it to the new application or sensor. In some implementations, at most one retained message per topic is stored at the server.

The publish message 406 can include a quality-of-service (QOS) field that indicates a requested level of message reliability. For example, a first level can be a "send and forget" level that has no guarantee of message delivery. A second level can be an "at least once" level, in which messages are guaranteed to be delivered at least once, with possible duplication of messages. A third level can be an "exactly one delivery" level, in which each message is guaranteed to be delivered exactly once.

Execution of an onMessage message handler can result in the preparation and initiation of the sending of a publish acknowledge message 407 from the server to the sensor who sent the publish message 406, such as for certain quality of service messages, such as quality of service levels other than the "send and forget" level. The publish acknowledgement message 407 includes a message type field indicating the publish acknowledgement message type and a client identifier that identifies the sensor to which the acknowledgement is being sent. A packet identifier field can uniquely identify the published message 406 that is being acknowledged.

A subscribe message 408 can be sent by a sensor to the server to request a subscription to one or more topics. The subscribe message 408 includes a message type field indicating the subscribe message type and a client (e.g., sensor) identifier identifying the sensor. The subscribe message 408 includes a topic list that includes a list of topic name and requested quality-of-service level value pairs. The subscribe message 408 can be sent without the inclusion of a message body.

In response to receipt of the subscribe message 408, the message broker can invoke an onSubscribe message handler of the application associated with the connection. Execution of the onSubscribe message handler can result in the preparation and initiation of the sending of a subscribe acknowledge message 410 from the server to the sensor who sent the subscribe message 408. The subscribe acknowledgement message 410 includes a message type field indicating the subscribe acknowledgement message type. The subscribe acknowledgement message 410 includes a return code (RC) list that includes a return code for each topic included in the topic list included in the subscribe message 408. Each respective return code indicates whether the application has approved the subscription request for the respective topic (e.g., a return code can indicate whether the application can fulfill the subscription request). The subscribe acknowledgement message 410 can be sent without the inclusion of a message body. After sensors have subscribed to a topic, an application can publish a message, and the message can be provided to each sensor who has subscribed to the topic included in the published message.

An unsubscribe message 412 can be sent by a sensor to the server to unsubscribe from one or more topics. The unsubscribe message 412 includes a message type field indicating the unsubscribe message type and a client (e.g., sensor) identifier identifying the sensor. The unsubscribe message 412 includes a topic list that includes a list of topic name and requested quality-of-service level value pairs. The unsubscribe message 412 can be sent without the inclusion of a message body.

In response to receipt of the unsubscribe message 412, the message broker can invoke an onUnsubscribe message handler of the application associated with the connection. Execution of the onUnsubscribe message handler can result in the preparation and initiation of the sending of an unsubscribe acknowledge message 414 from the server to the sensor who sent the unsubscribe message 412. The unsubscribe acknowledgement message 414 includes a message type field indicating the unsubscribe acknowledgement message type. The unsubscribe acknowledgement message 414 includes a return code (RC) list that includes a return code for each topic included in the topic list included in the unsubscribe message 412. Each respective return code indicates whether the application successfully processed the unsubscribe request for the respective topic. The unsubscribe acknowledgement message 414 can be sent without the inclusion of a message body.

A disconnect message 416 can be sent from a sensor to the server to request the closing of the connection between the server and the sensor. The disconnect message 416 can include a message type field indicating the disconnect message type and a client (e.g., sensor) identifier identifying the sensor. The disconnect message 416 can be sent without the inclusion of a message body. In response to receipt of the disconnect message 416, the message broker can invoke an onClose message handler of the application. Execution of the onClose message handler can include server processing to close the connection. A disconnect or close message can also be sent from an application to a particular sensor, to close the connection between the application and the sensor.

In addition to invoking the onStart, onMessage, onSubscribe, and onUnsubscribe message handlers, the message broker can invoke an onError message handler of an application if an error condition occurs. Error conditions can include, for example, a resource (e.g., memory) shortage, a network error (e.g., a broken or otherwise unavailable connection), or a client protocol error. The onError message handler can receive an error code that can indicate a type of error. The onError message handler can include code to handle the error. The network connection can be closed after the onError message handler completes.

In some implementations, a client can send a generic message to the server which includes, in a property of the message, the name of a handler possibly supported by the application. The generic message can be used to extend the protocol without having to change the message broker for each new message type. The message broker can, when receiving the generic message, determine whether the application provides a handler that is indicated in the message. For example, the generic message can include a property which specifies an onSignal message handler. The message broker can extract the property value indicating the onSignal message handler from the generic message and determine whether the application provides an onSignal message handler. If the application provides an onSignal message handler, the message broker can invoke the onSignal message handler and provide, to the onSignal message handler, other information included in the generic message.

Figure 5:
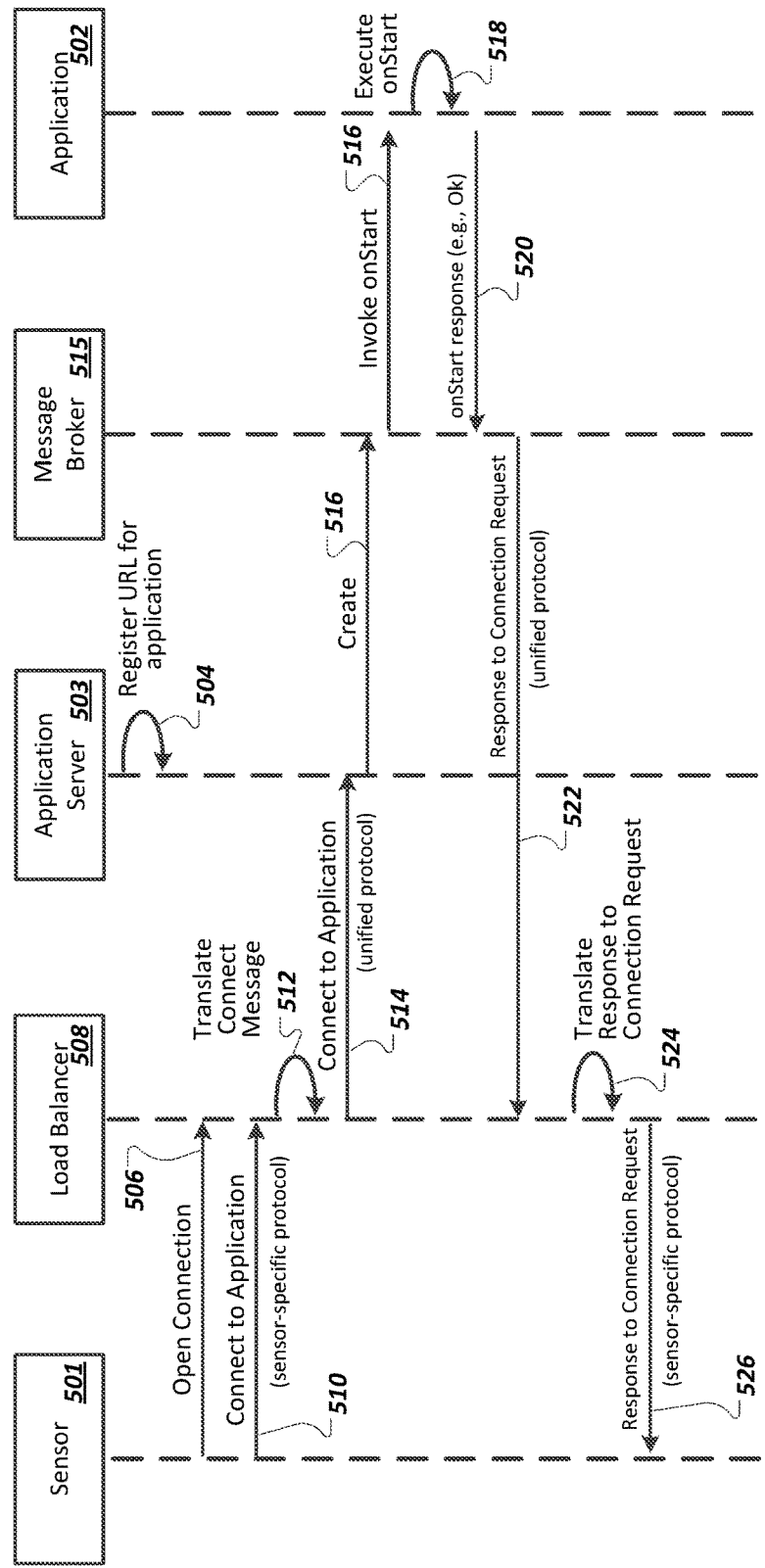
FIG. 5 is a flowchart of an example method for establishing a connection between a sensor and an application executing on an application server.

FIG. 5 is a flowchart of an example method 500 for establishing a connection between a sensor 501 and an application 502 executing on an application server 503. The application server 503 registers a URL for the application 502 (e.g., as illustrated by an arrow 504). The sensor 501 sends a request 506 to a load balancer 508 to open a connection to the application 502. The request 506 can be sent to a particular port associated with the load balancer 508, for example. The sensor 501 sends a request 510 to the load balancer 510 to open a connection to the application 502 (e.g., referencing the URL registered for the application 502). The requests 506 and 510 can be, for example, in a sensor-specific protocol.

The load balancer 508 translates the connection request 510 (e.g., as illustrated by an arrow 512) from the sensor-specific protocol to a unified protocol that is recognizable by the application server 502. The load balancer 508 sends a connection request message 514, in the unified protocol format, to the application server 503. In some implementations, the load balancer 508 calls a load balancing library to identify the application server 503 as a preferred application server from among multiple application servers. The load balancer 508 can open a HTTP network connection to the application server 503 and send an upgrade request to upgrade the connection to use a socket protocol, for example. If the application server 503 accepts the upgrade request, a socket-based connection is established between the application server 503 and the load balancer 508.

In response to the connection request message 514, the application server 503 instantiates a message broker 515 to handle messages for the application 502. The message broker 515 invokes an onStart( )API message handler of the application 502 (e.g., as illustrated by arrow 516). The application 502 executes the onStart( )message handler (e.g., as illustrated by an arrow 518) and returns a response code (e.g., Ok, Error) to the message broker 515 (e.g., as illustrated by arrow 520). The message broker 515 sends the response code to the load balancer 508 (e.g., as illustrated by arrow 522), in the unified protocol message format. The load balancer 508 translates the unified protocol message into a sensor-specific message (e.g., as illustrated by arrow 524) and sends the response code in the sensor specific message to the sensor 501 (e.g., as illustrated by arrow 526).

Figure 6:
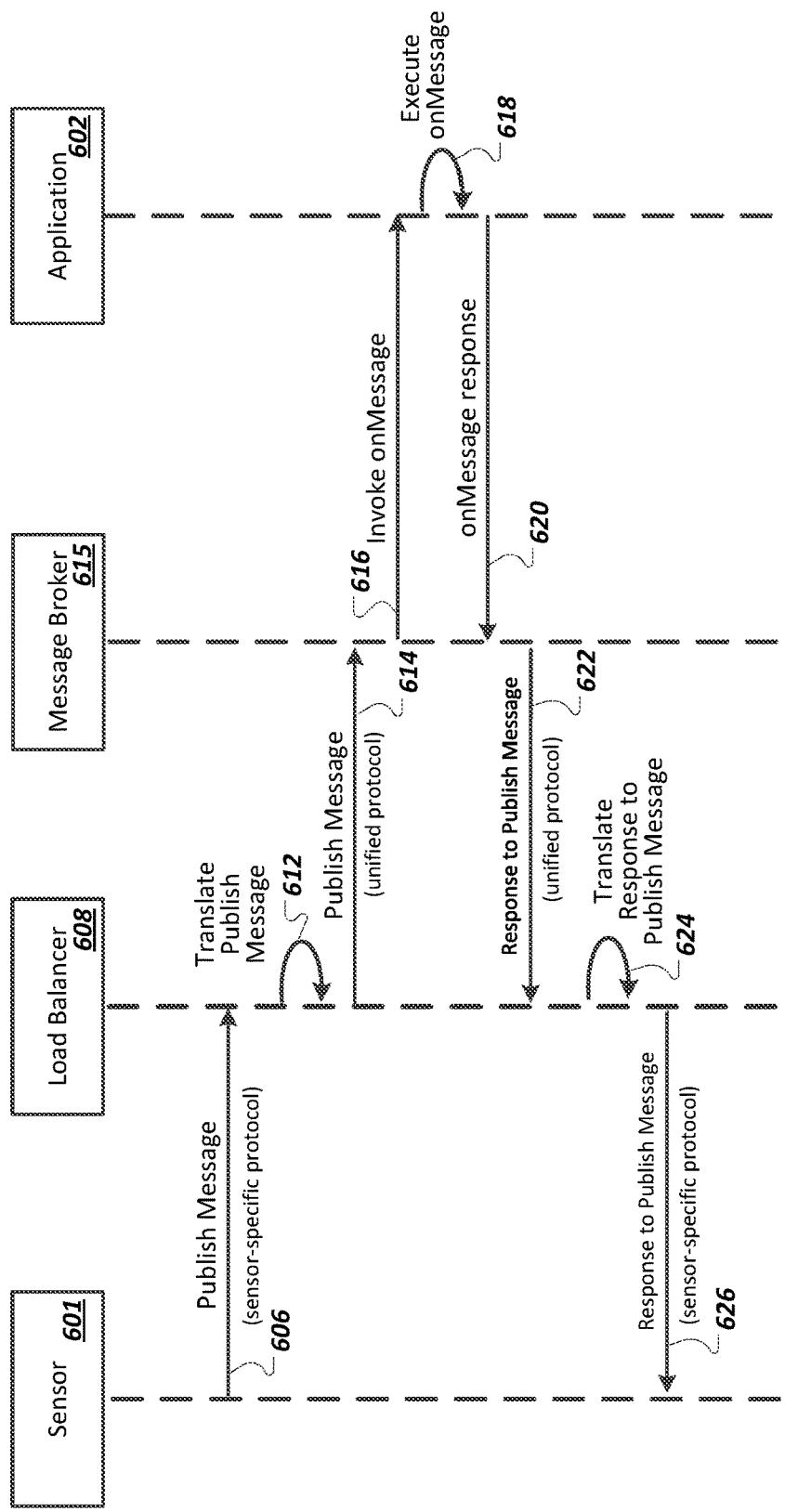
FIG. 6 a flowchart of an example method for sending a publish message from a sensor to an application executing on an application server.

FIG. 6 is a flowchart of an example method 600 for sending a publish message from a sensor 601 to an application 602 executing on an application server. The sensor 601 has previously established a connection with the application 602 (e.g., as described above with respect to FIG. 5). The sensor 601 sends a publish message 606 in a sensor-specific format to a load balancer 608. The load balancer 608 translates the publish message 606 (e.g., as illustrated by an arrow 612) from the sensor-specific protocol to a unified protocol that is recognizable by the application server.

The load balancer 608 sends a translated message 614, in the unified protocol format, to a message broker 615 included in the application server. The message broker 615 invokes an onMessage( )API message handler of the application 602 (e.g., as illustrated by an arrow 616). The application 602 executes the onMessage( )message handler (e.g., as illustrated by arrow 618) and returns a response code (e.g., Ok, Error) to the message broker 615 (e.g., as illustrated by arrow 620). The message broker 615 sends the response code to the load balancer 608 (e.g., as illustrated by arrow 622), in the unified protocol message format. The load balancer 608 translates the unified protocol message into a sensor-specific message (e.g., as illustrated by an arrow 624) and sends the response code in the sensor specific message to the sensor 601 (e.g., as illustrated by an arrow 626).

Figure 7:
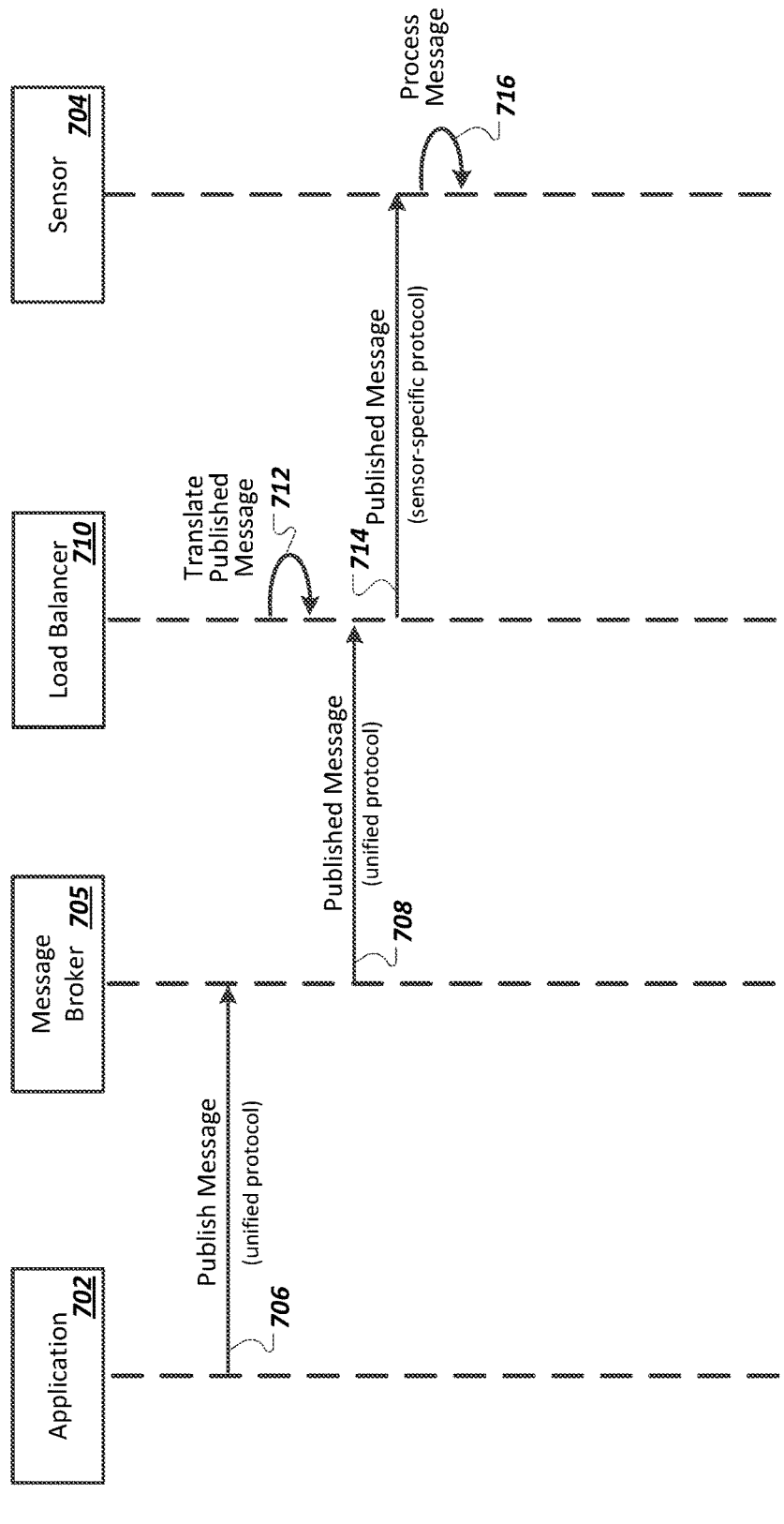
FIG. 7 is a flowchart of an example method for sending a message from a server application to a sensor.

FIG. 7 is a flowchart of an example method 700 for sending a message from a server application 702 to a sensor 704. The sensor 704 has previously established a connection with the server application 702 (e.g., as described above with respect to FIG. 5) and subscribed to the topic. The server application 702 can use an API provided by an message broker 705 to publish a message 706 to sensors, including the sensor 704, that have subscribed to a particular topic. The message 706 can include, for example, a client (e.g., sensor) identifier, a message topic, a message payload (e.g., text or binary), and a quality of service indicator.

The message 706 can be in a unified protocol format understood by the server. The message broker 705 can receive the message 706 and forward the message 706 (e.g., as a forwarded message 708) to a load balancer 710. The load balancer 710 can translate the forwarded message 708 to a sensor-specific protocol understood by the sensor 704 (e.g., as illustrated by arrow 712). The load balancer 710 can send a translated message 714, in the sensor-specific protocol format, to the sensor 704. The sensor 704 can process the translated message 714 (e.g., as illustrated by an arrow 716).

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method, comprising: receiving, at a load balancer, a first message from a first sensor to a backend application server, the first message in a first sensor-specific protocol, and the first message including a message handler name of a message handler that is to handle a payload of the first message;

identifying, by the load balancer, the first sensor-specific protocol of the first message; translating, by the load balancer, the first message from the first sensor-specific protocol to a second message in a unified protocol associated with the backend application server; and transmitting, by the load balancer, the second message in the unified protocol to the backend application server for processing by a backend application server application;

receiving the second message at a message broker;

extracting, from the second message and by the message broker, the message handler name;

determining, by the message handler, that the backend server application provides a message handler named with the message handler name; in response to determining that the backend server application provides a message handler named with the message handler name, providing a payload of the second message to the backend server application;

receiving, by the load balancer, a third message, in the unified protocol, from the backend application server application, wherein the third message has a first topic, is targeted to sensors subscribed to the first topic, and has a retain flag set wherein the load balancer automatically sends the third message to new sensors that subscribe to the first topic after the third message is sent in response to the new sensors subscribing to the first topic;

determining, by the load balancer, that the first sensor has subscribed to the first topic;

in response to determining that the first sensor has subscribed to the first topic: performing, by the load balancer, a first translation of the third message, from the unified protocol to the first sensor-specific protocol, to create a fourth message; and sending, by the load balancer, the fourth message to the first sensor; after receiving the third message, receiving, at the load balancer, a subscription request for the first topic from a second sensor, the subscription request in a second sensor-specific protocol that is a different protocol than the first sensor-specific protocol and the unified protocol; determining, by the load balancer, that the third message has the retain flag set and has not been sent to the second sensor; and in response to determining that the third message has the retain flag set and has not been sent to the second sensor:

performing, by the load balancer, a second translation of the third message, from the unified protocol to the second sensor-specific protocol, to create a fifth message; and transmitting, by the load balancer, the fifth message to the second sensor.

2. The method of claim 1, wherein processing includes receiving the second message by a message broker.

3. The method of claim 2, wherein processing includes identifying, by the message broker, a second topic associated with the second message.

4. The method of claim 3, wherein processing includes sending, by the message broker, the second message to one or more backend application server applications that have subscribed to the second topic.

5. The method of claim 2, further comprising: identifying, by the load balancer, the second sensor-specific protocol of the subscription request; translating, by the load balancer, the subscription request from the second sensor-specific protocol to a sixth message in the unified protocol; transmitting, by the load balancer, the sixth message in the unified protocol to the message broker for processing.

6. The method of claim 5, wherein the first sensor is configured to send and receive messages in the first sensor-specific protocol but is not configured to send or receive messages in the second sensor-specific protocol or the unified protocol.

7. The method of claim 5, wherein the load balancer is configured to receive the first message at a first port associated with the first sensor-specific protocol and the subscription request at a second port associated with the second sensor-specific protocol.

8. The method of claim 1, wherein the first message is translated to a seventh message in an existing application server protocol that is different than the unified protocol and then to the second message in the unified protocol.

9. The method of claim 1, further comprising: modifying the load balancer to support a new, third sensor-specific protocol without modifying or restarting the backend application server or the backend application server application; receiving, at the load balancer, an eighth message from a third sensor to the backend application server, the eighth message in the new, third sensor-specific protocol; identifying, by the load balancer, the new, third sensor-specific protocol of the eighth message; translating, by the load balancer, the eighth message from the new, third sensor-specific protocol to a ninth message in the unified protocol associated with the backend application server; transmitting, by the load balancer, the ninth message in the unified protocol to the backend application server for processing.

10. A system comprising:
at least one processor;
a non-transitory computer-readable medium coupled to the at least one processor having instructions stored thereon which, when executed by the at least one processor, cause the at least one processor to perform operations, wherein the operations include:
receiving a first message from a first sensor to a backend application server, the first message in a first sensor-specific protocol, and the first message including a message handler name of a message handler that is to handle a payload of the first message;
identifying the first sensor-specific protocol of the first message;
translating the first message from the first sensor-specific protocol to a second message in a unified protocol associated with the backend application server; and
transmitting the second message in the unified protocol to the backend application server for processing by a backend application server application;
receiving a third message, in the unified protocol, from the backend application server application, wherein the third message has a first topic, is targeted to sensors subscribed to the first topic, and has a retain flag set wherein the third message is automatically sent to new sensors that subscribe to the first topic after the third message is sent in response to the new sensors subscribing to the first topic;
determining that the first sensor has subscribed to the first topic;
in response to determining that the first sensor has subscribed to the first topic:
performing a first translation of the third message, from the unified protocol to the first sensor-specific protocol, to create a fourth message; and
sending the fourth message to the first sensor;
after receiving the third message, receiving a subscription request for the first topic from a second sensor, the subscription request in a second sensor-specific protocol that is a different protocol than the first sensor-specific protocol and the unified protocol;
determining that the third message has the retain flag set and has not been sent to the second sensor; and
in response to determining that the third message has the retain flag set and has not been sent to the second sensor:
performing a second translation of the third message, from the unified protocol to the second sensor-specific protocol, to create a fifth message; and
transmitting the fifth message to the second sensor; and
receiving the second message at a message broker;
extracting, from the second message and by the message broker, the message handler name;
determining that the backend server application provides a message handler named with the message handler name; and
in response to determining that the backend server application provides a message handler named with the message handler name, providing a payload of the second message to the backend server application.

11. The system of claim 10, wherein processing includes receiving the second message by a message broker.

12. The system of claim 11, wherein processing includes identifying, by the message broker, a second topic associated with the second message.

13. A computer program product encoded on a non-transitory storage medium, the product comprising non-transitory, computer readable instructions for causing one or more processors to perform operations comprising: receiving, at a load balancer, a first message from a first sensor to a backend application server, the first message in a first sensor-specific protocol, and the first message including a message handler name of a message handler that is to handle a payload of the first message; identifying, by the load balancer, the first sensor-specific protocol of the first message; translating, by the load balancer, the first message from the first sensor-specific protocol to a second message in a unified protocol associated with the backend application server; and transmitting, by the load balancer, the second message in the unified protocol to the backend application server for processing by a backend application server application; receiving the second message at a message broker; extracting, from the second message and by the message broker, the message handler name; determining, by the message handler, that the backend server application provides a message handler named with the message handler name; in response to determining that the backend server application provides a message handler named with the message handler name, providing a payload of the second message to the backend server application; receiving, by the load balancer, a third message, in the unified protocol, from the backend application server application, wherein the third message has a first topic, is targeted to sensors subscribed to the first topic, and has a retain flag set wherein the load balancer automatically sends the third message to new sensors that subscribe to the first topic after the third message is sent in response to the new sensors subscribing to the first topic; determining, by the load balancer, that the first sensor has subscribed to the first topic; in response to determining that the first sensor has subscribed to the first topic: performing, by the load balancer, a first translation of the third message, from the unified protocol to the first sensor-specific protocol, to create a fourth message; and sending, by the load balancer, the fourth message to the first sensor; after receiving the third message, receiving, at the load balancer, a subscription request for the first topic from a second sensor, the subscription request in a second sensor-specific protocol that is a different protocol than the first sensor-specific protocol and the unified protocol; determining, by the load balancer, that the third message has the retain flag set and has not been sent to the second sensor; and in response to determining that the third message has the retain flag set and has not been sent to the second sensor: performing, by the load balancer, a second translation of the third message, from the unified protocol to the second sensor-specific protocol, to create a fifth message; and transmitting, by the load balancer, the fifth message to the second sensor.

14. The computer program product of claim 13, wherein processing includes receiving the second message by a message broker.

15. The computer program product of claim 14, wherein processing includes identifying, by the message broker, a second topic associated with the second message.

16. The computer program product of claim 13, the operations further comprising: modifying the load balancer to support a new, third sensor-specific protocol without modifying or restarting the backend application server or the backend application server application; receiving, at the load balancer, an eighth message from a third sensor to the backend application server, the eighth message in the new, third sensor-specific protocol; identifying, by the load balancer, the new, third sensor-specific protocol of the eighth message; translating, by the load balancer, the eighth message from the new, third sensor-specific protocol to a ninth message in the unified protocol associated with the backend application server; transmitting, by the load balancer, the ninth message in the unified protocol to the backend application server for processing.

* * * * *